US012618991B2

(12) United States Patent     (10) Patent No.:   US 12,618,991 B2

Kar et al.           (45) Date of Patent:       May 5, 2026

(54) PERSON IDENTIFICATION AND IMPOSTER DETECTION USING FOOTFALL GENERATED SEISMIC SIGNALS

(71) Applicant: INDIAN INSTITUTE OF TECHNOLOGY DELHI, New Delhi (IN)

(72) Inventors: Subrat Kar, New Delhi (IN); Bodhibrata Mukhopadhyay, New Delhi (IN); Sahil Anchal, New Delhi (IN)

(73) Assignee: INDIAN INSTITUTE OF TECHNOLOGY DELHI, New Delhi (IN)

( * ) Notice: Subject to any disclaimer, the term of this patent is extended or adjusted under 35 U.S.C. 154(b) by 1024 days.

(21) Appl. No.: 17/112,551

(22) Filed: Dec. 4, 2020

(65) Prior Publication Data

US 2021/0182603 A1     Jun. 17, 2021

(30) Foreign Application Priority Data

Dec. 5, 2019    (IN)  .............................  201911050076

(51) Int. Cl.
| | |
|---|---|
| *G01V 1/00* | (2024.01) |
| *G01V 1/04* | (2006.01) |
| *G06F 18/214* | (2023.01) |
| *G06F 18/2321* | (2023.01) |
| *G06N 3/08* | (2023.01) |
| *G06V 10/764* | (2022.01) |
| *G06V 40/10* | (2022.01) |

(52) U.S. Cl.
CPC ................ *G01V 1/001* (2013.01); *G01V 1/04* (2013.01); *G06F 18/214* (2023.01); *G06F*

*18/2321* (2023.01); *G06N 3/08* (2013.01); *G06V 10/764* (2022.01); *G06V 40/10* (2022.01)

(58) Field of Classification Search
CPC .......... G01V 1/001; G01V 1/04; G06V 40/10; G06V 10/764; G06F 18/214; G06F 18/2321; G06F 18/213; G06N 3/08
See application file for complete search history.

(56) References Cited

U.S. PATENT DOCUMENTS

| | | |
|---|---|---|
| 2018/0018509 A1 | 1/2018 | Zhang et al. |
| 2018/0106917 A1* | 4/2018 | Osypov .................. G01V 1/003 |

(Continued)

OTHER PUBLICATIONS

Pan et al., 1915, "Indoor Person Identification through Footstep Induced Structural Vibration", in Proc. 16th Int. Workshop on Mobile Comput. Syst. and Appl. New York, NY, USA: ACM, 2015, pp. 81-86 (Year: 1915).*

(Continued)

*Primary Examiner* — Lina Cordero
*Assistant Examiner* — Lyudmila Zaykova-Feldman
(74) *Attorney, Agent, or Firm* — Merchant & Gould P.C.

(57)            ABSTRACT

A smart device, biometric authentication system and a corresponding method thereof for person identification and imposter detection has been disclosed. The method comprises detection and extraction of seismic signals generated from corresponding footfalls, by means of unsupervised learning based detection and extraction module (USLEEM) and detection and identification of imposter and/or registered users respectively by means of an identification module.

9 Claims, 8 Drawing Sheets

(a)

(b)

(56) References Cited

U.S. PATENT DOCUMENTS

| | | | |
|---|---|---|---|
| 2018/0120783 A1 | 5/2018 | Billings | |
| 2018/0210404 A1 | 7/2018 | Billings | |
| 2019/0383965 A1* | 12/2019 | Salman | G01V 11/00 |
| 2020/0311489 A1* | 10/2020 | Taylor | G06F 18/231 |
| 2021/0158137 A1* | 5/2021 | Sasao | G06N 3/04 |

OTHER PUBLICATIONS

Liu et al., 2014, "Unsupervised One-Class Learning for Automatic Outlier Removal," 2014 IEEE Conference on Computer Vision and Pattern Recognition, Columbus, OH, USA, 2014, pp. 3826-3833 (Year: 2014).*

Anchal et al., 2017, "UREDT: Unsupervised learning based Real-time footfall Event Detection Technique in seismic signal", IEEE Sensors Letters, Dec. 2017, pp. 1-4 (Year: 2017).*

Clemente et al., Smart Seismic Sensing for Indoor Fall detection, Location, and Notification, IEEE Journal of Biomedical and Health Informatics, vol. 24, No. 2, pp. 524-532, Feb. 2020 (Date of publication Mar. 31, 2019) (Year: 2019).*

Clemente et al., "Smart Seismic Sensing for Indoor Fall Detection, Location, and Notification," IEEE Journal of Biomedical And Health Informatics, 2020, 24(2):524-532.

Pan et al., "Indoor Person Identification through Footstep Induced Structural Vibration," Hotmobile 15, 2015: 81-86.

* cited by examiner

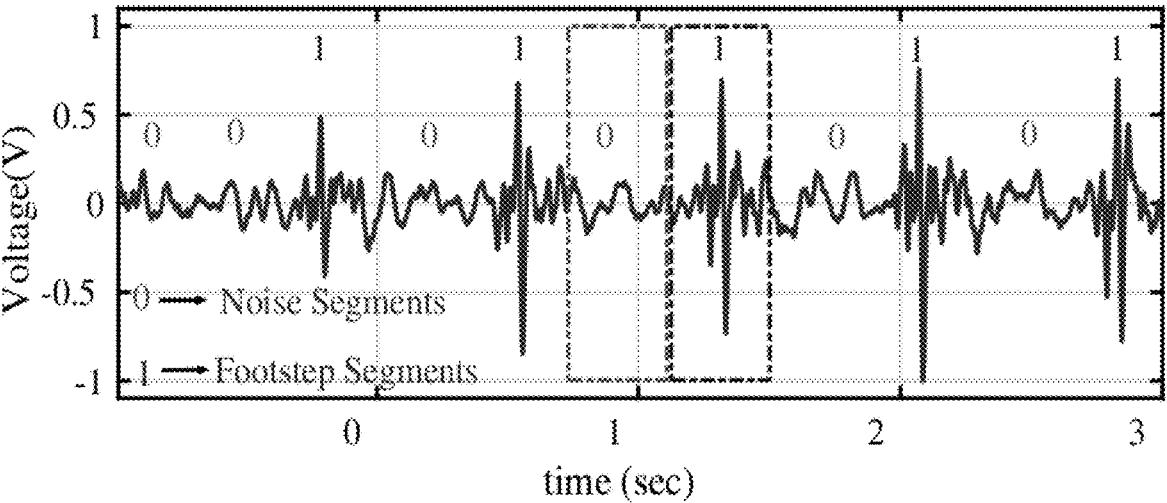
(a) Detecting footfall events in a seismic signal.
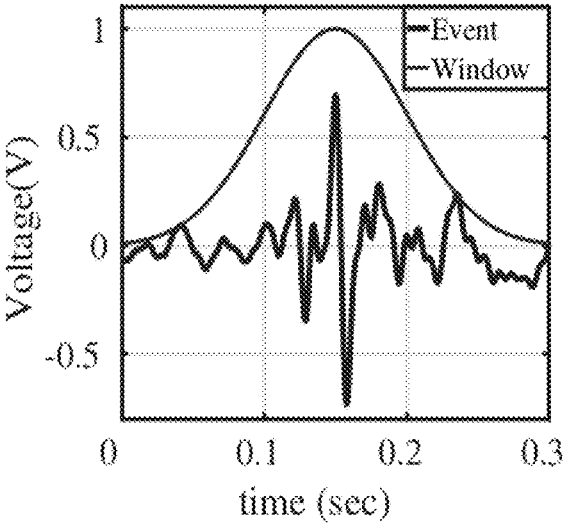
(b) Multiplying a detected footfall event with a Gaussian window.
Figure 3

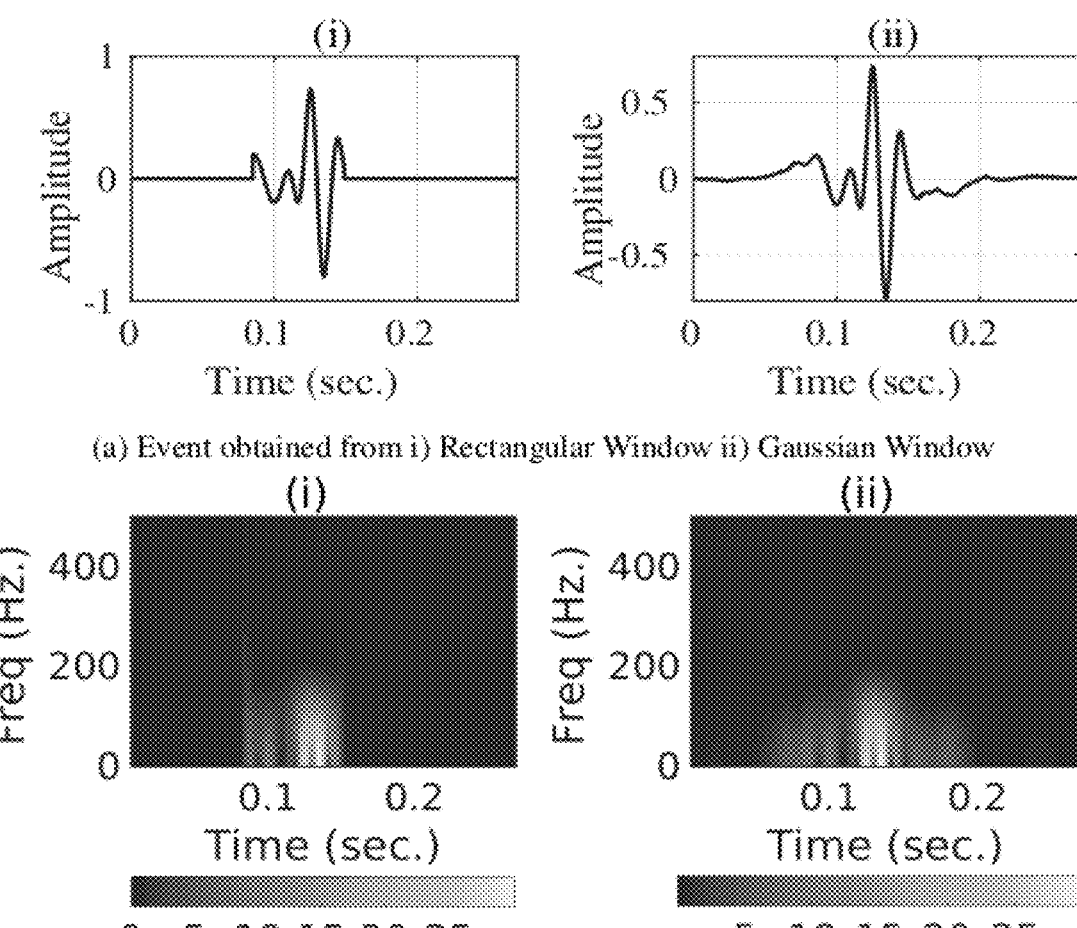
(a) Event obtained from i) Rectangular Window ii) Gaussian Window
(b) Frequency spectrum of event obtained from i) Rectangular window ii) Gaussian Window
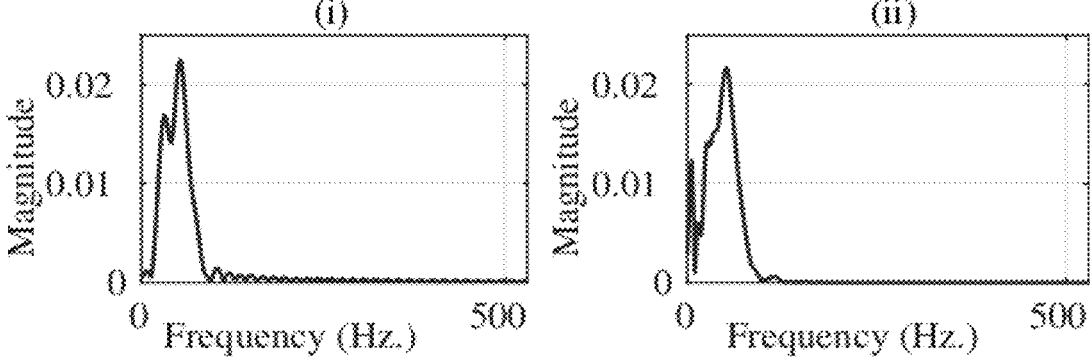
(c) Spectrogram of event obtained from i) Rectangular window ii) Gaussian Window
Figure 4

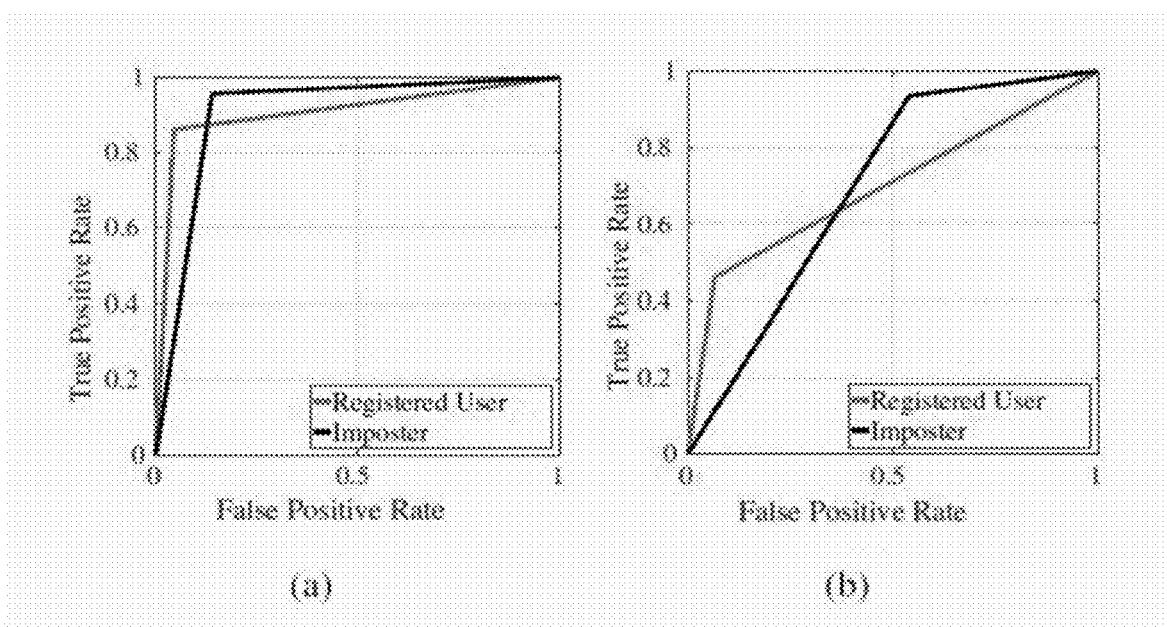
Figure 9
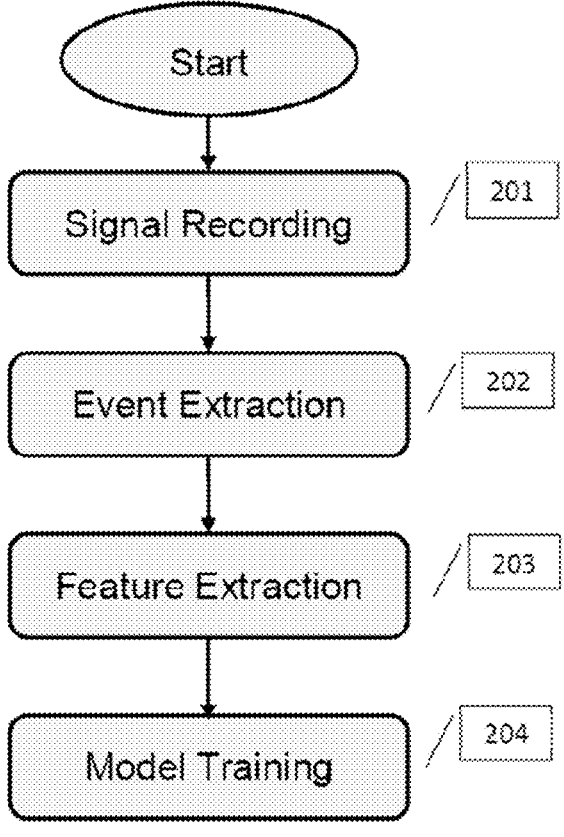
Figure 10: Training Phase

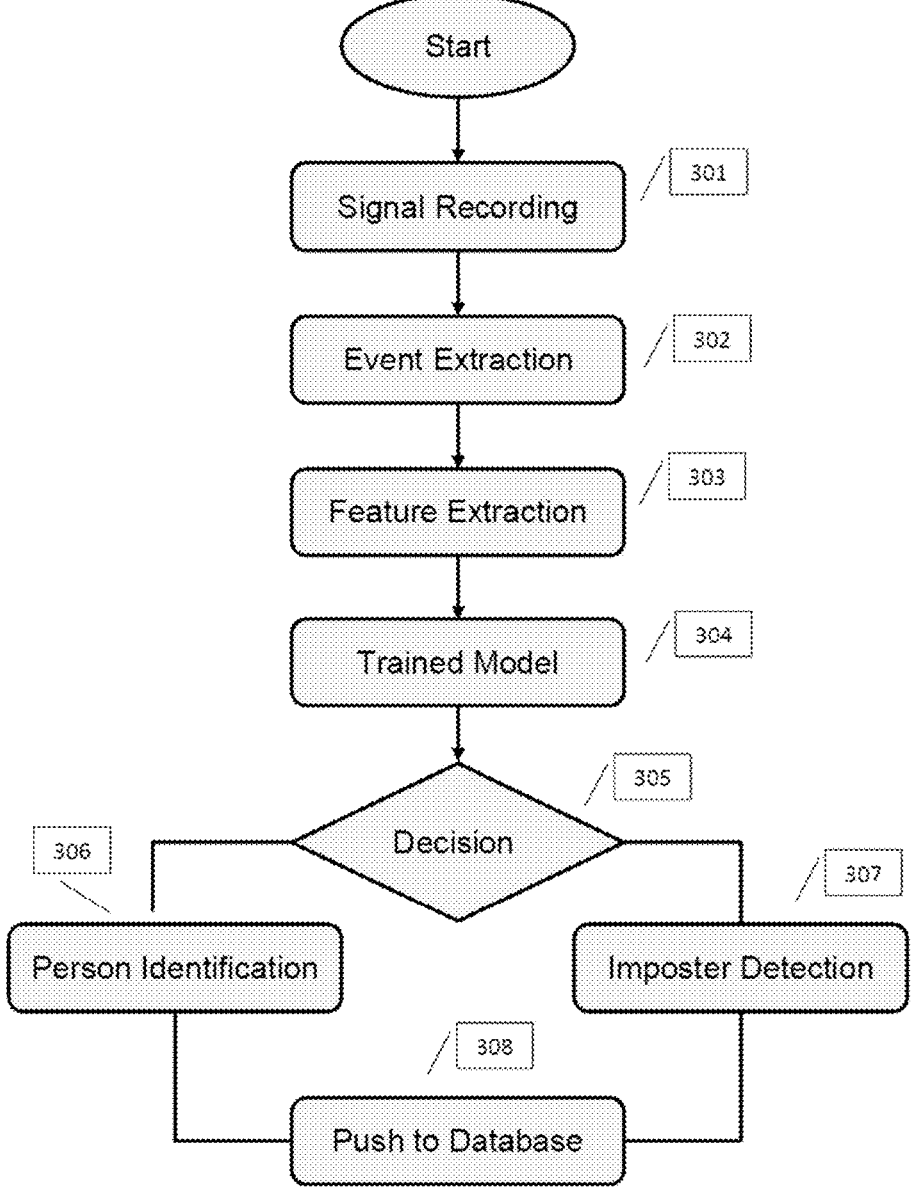
Figure 11: Live Phase

PERSON IDENTIFICATION AND IMPOSTER DETECTION USING FOOTFALL GENERATED SEISMIC SIGNALS

FIELD OF THE INVENTION

Present invention in general relates to automatic human identification and imposter detection technique, more particularly automatic human identification and imposter detection technique using footfall generated seismic signal.

BACKGROUND OF THE INVENTION

Surveillance is an integral part of an institution or organization, and due to an increased level of various kinds of threats, a lot of research and experimentation is being carried out to ensure a full-proof security system. Covert observation of people using smart camouflageable sensor is gaining popularity. It is important for an organization, especially high-security establishment to identify its own people i.e., their registered users and also to detect imposters i.e., non-registered users with high accuracy.

Increased security breaches coupled with the misuse of the present all-pervasive power of technology and its subsequent deleterious effects on mankind have made it all the more important than ever to device new preventive measures which can nip any malicious intent right in the bud.

Predominantly human identification is carried manually by access cards (RFID cards). Advancement of signal processing and recent developments in modern sensors gave opportunity to biometric based identification or verification systems. These systems use a physical or behavioural property as biometrics for person identification. Camera, fingerprint scanner, interferometric reflectance imaging sensor (IRIS), microphone sensors are used to identify humans by exploiting physical biometrics like facial images, fingerprints, voice etc. On the other hand, biometric using behavioural features like gait, walking patterns, Infrared radiation from body surface, footfall signature etc. are carried by sensors like video camera, accelerometer, pressure sensor, Passive Infrared (PIR) sensor, ultra-wide band sensor, acoustic, and seismic sensor.

Other sensors used for identification are cameras that demand a certain amount of ambient light and a clear facial image, microphones that require a low level of background noise, and fingerprint sensors that require an individual to place his/her finger on the scanner. Direct line of sight (LOS) is necessary for radio frequency related sensors, and wearable sensors like accelerometer need to be attached to the body of the subject.

A crucial part of any behavioural based biometric system is its event detection and extraction technique. Researchers have used techniques like amplitude thresholding (AMP-Th), STA-LTA, kurtosis, UREDT, and noise modelling for event detection in seismic signal.

Another vital aspect of any surveillance system is its ability to detect intruders (imposters). Most of the automated biometric systems (especially the ones that use behavioural properties) work on the principle of matching signatures of a fresh data to a pre stored data. However, little work has been done in detecting imposters (individuals whose data are not present in the system database) using behavioural properties of individuals.

The existing systems are able to predict only those individuals whose data are already present in the database. In the absence of an individual's data in the database, the existing systems will predict the class (or individual) with which the test data have maximum similarity.

Reference is made to non-patent literature documents "*Indoor person identification through footstep induced structural vibration*" and "*Footprint id: Indoor pedestrian identification through ambient structural vibration sensing*" by S. Pan. The documents teach utilizing footstep induced structural vibrations to identify humans. In "Indoor person identification through footstep induced structural vibration", time and frequency related features from the footfall signal have been extracted and classified by using SVM (support vector machine). Their dataset consisted of ~ 1500 footsteps of 5 individuals. The performance of the system was calculated for both step level and trace level accuracies. In the step level scenario only a single footfall is considered, and in the trace level scenario 5 footfalls of the highest SNR (signal to noise ration) are taken as a single sample for identification. The system achieved an accuracy of 63% in step level and 83% in trace level scenarios. A confidence level thresholding (CLT) of the signals have also been performed, by 50% of the traces were discarded and eliminated potentially incorrect classification cases. Using this CLT they observed an increased accuracy of 96.5%.

In "*Footprint id: Indoor pedestrian identification through ambient structural vibration sensing*", an event detection technique of another non-patent literature document "*Boes: building occupancy estimation system using sparse ambient vibration monitoring*", has been implemented modelling noise as a Gaussian distribution. An event is detected if the energy of the signal inside the current window is beyond three standard-deviation above the mean of noise. A window length of 250 ms has been considered. An iterative transductive learning algorithm (ITSVM) is used to achieve robust classification. The system was also tested for varying walking speed of the individuals. The performance of the system in "*Footprint id: Indoor pedestrian identification through ambient structural vibration sensing*" was calculated for three types of scenarios: (a) a sample consists only a single step, (b) using selected steps (only those closest to the sensor) as a single sample, and (c) using 10 to 15 steps (trace) as a single sample. They reported that when the system was trained with single trace samples they achieved an accuracy of 60%, 62%, and 80% for the three scenarios. As the number of traces per sample in the training set are increased to 6 the accuracies of the three scenarios increased to 83%, 87%, and 97% respectively. So, the main drawback of their technique is the requirement of a large number of consecutive footsteps to achieve high accuracy.

Non patent literature "*Subject recognition based on ground reaction force measurements of gait signals*", by S. P Moustakidis teaches recognizing human subjects using ground reaction force (GRF). GRF is measured with series flush mounted ground force platforms. Their prediction algorithm consisted of three stages, wavelet transform of GRF data, feature extraction, and classification. Their dataset consisted of GRF data of 40 subjects. They designed experiments where individuals walked at different speeds and carried loads of various weights.

"*Deep neural networks for learning spatio-temporal features from tomography sensors*", by Omar, teaches the implementation of convolutional neural network for learning spatio-temporal features of different gait patterns. They acquired the gait patterns using floor pressure tomography sensors (iMAGiMAT). The system comprises of 116 plastics optical fibres. The fibres are distributed over an area of 2m². The frame rate of the overall system is 256 Hz. The authors created their own floor sensor dataset, which contains 892 samples encompassing 13 different gait patterns (10 manners of walking, and 3 cognitive-oriented tasks). They obtained an F-score of 97.88% for gait pattern classification. They also showed that features extracted from raw data give substantially better performance than features extracted from reconstructed images of each sample.

In another non patent literature "*Analysis of spatio-temporal representations for robust footstep recognition with deep residual neural networks*", by Omar discloses a footstep based biometric system. Spatio-temporal footstep representations from floor sensors have been used for automatic biometric verification. The model was able to differentiate between legitimate users (clients) and imposters (intruders). The performance of their biometric system was tested using a dataset (SFootBD) comprising 20,000 footstep signals from more than 120 people. Footstep data were acquired using two rectangular sensor mats of dimension 45×30 cm$^2$. Each mat comprised of 88 piezoelectric sensors. The frame rate of the system is 1.6 kHz. For experimental validation, three security scenarios were considered while training and testing of the models. Authors have used ResNet architect for deep learning models and achieved a false acceptance and false rejection rates of 0.7%. The main drawback of these techniques is that the user has to stand on the iMAGi-MAT floor sensor system or pressure mat for gait analysis or person identification. Also, the scalability of the system is a big challenge as sensor density (number of sensors per unit area) is very high.

In some existing non patent literature an imposter detection scenario is discussed and is detected after the model has been trained with an imposter dataset. Some existing prior art relates to spoofing detection using video analysis. A spatial-temporal method is implemented for video based facial spoof detection. They analyse content-independent noise signatures (present in the video) to distinguish fake and valid users. The Fourier spectrum of the image is accompanied by video visual rhythms (which provide temporal information) to extract features.

In any biometric/surveillance techniques, signals from sensor(s) (e.g. camera, passive infrared sensor, pressure sensor) are recorded continuously. However, the entire signal does not contain the necessary information and performing computations on the entire signal is computationally expensive and resource intensive. Hence, it is important to have an event detection and extraction technique which locates and subsequently extracts the portion of the signal that contains the necessary information. Personal biometric authentication system can be based on physical or behavioural traits. A crucial part of any biometric system is the detection of the onset of an event. Therefore, there remains a need for effectively detecting imposters from footfall generated seismic signals generated due to the vibration of the floor as an individual's heel and toe touches the ground while walking by effectively extracting necessary information and performing computations from the seismic signals generated thereof.

SUMMARY OF THE INVENTION

The following presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An objective of present invention is to provide a biometric system for identification of humans and detection of imposters using a seismic sensor.

Yet another objective of present invention is to provide an unsupervised learning based footfall event/seismic event detection and extraction technique (USLEEM) for identification of humans and detection of imposters whose data are not present in the system database.

According to one aspect of the present invention, a method for person identification and imposter detection, said method comprising steps of: detection and extraction of seismic signals generated from corresponding footfalls, by means of unsupervised learning based detection and extraction module (USLEEM); and detection and identification of imposter and/or registered users respectively by means of an identification module.

According to another aspect of the present invention, a smart device for person identification and imposter detection configured to perform the method steps as mentioned above, said smart device comprising: at least one sensing module configured to detect a plurality of seismic signals generated from corresponding footfall of a person to generate a seismic event; an analog-to-digital converter module configured to convert detected analog seismic signals into digital signals, an event extraction module configured to split a seismic signal, of the plurality of said seismic signals, into N equal segments, and extract, vectors corresponding to time domain and frequency domain features from each said segment of the N segments; cluster each of the said vectors into a clustered event; and store said trained model; and an identification module configured to identify either an imposter or a registered person.

According to yet another aspect of the present invention, a biometric authentication system for person identification and imposter detection, said system comprising: an array of smart devices, as described above, distributed over a predetermined zone; and a central controller operatively communicable to said smart devices adapted to perform the method steps as detailed herein above.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

The above and other aspects, features and advantages of the embodiments of the present disclosure will be more apparent in the following description taken in conjunction with the accompanying drawings, in which:

FIG. 3 illustrates the event extraction process of USLEEM according to an embodiment of present invention.

FIG. 4 illustrates effect of rectangular and Gaussian window on the frequency content of the extracted footfall event according to exemplary implementations of an embodiment of present invention.

FIG. 9 illustrates ROC curve of a) SVDD and b)OC-SVM for imposter detection scenario 2 (refer Table. IV) obtained using $dataset_{10}$ (number of registered users and imposters are 4 and 3).

FIGS. 10 and 11 illustrate the training phase and live phase working implementation of a method for person identification and imposter detection using unsupervised learning based detection and extraction module, USLEEM, according to an embodiment of the present invention.

Figure 12:
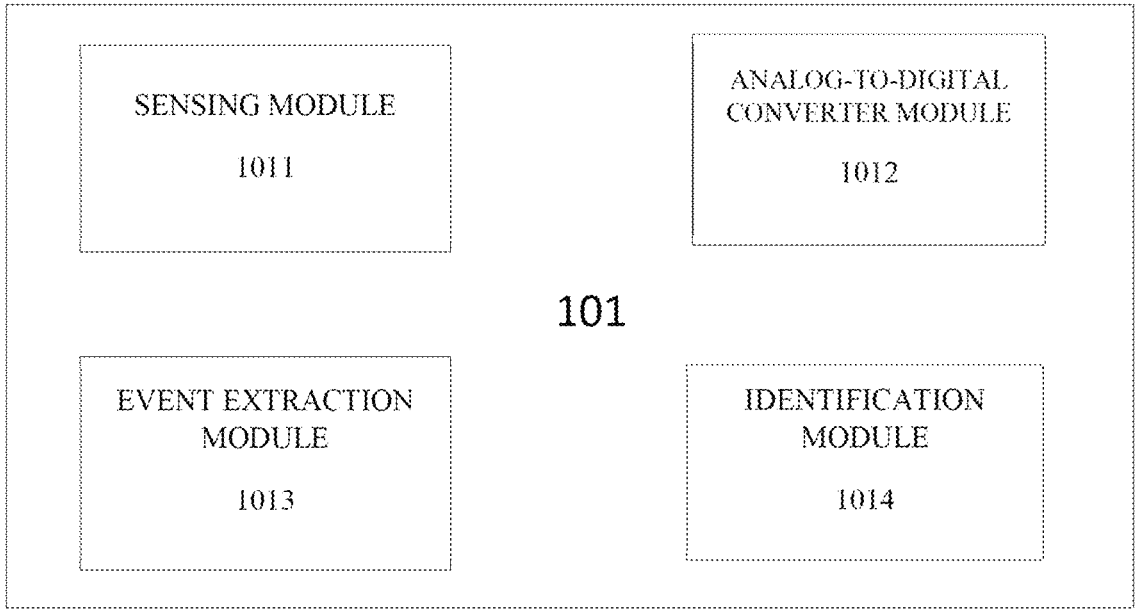

FIG. 12 illustrate a smart device for person identification and imposter detection, according to an embodiment of the present invention.

Persons skilled in the art will appreciate that elements in the figures are illustrated for simplicity and clarity and may have not been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms (including technical and scientific terms) used herein have the same meaning as commonly understood by one of ordinary skill in the art to which various embodiments belong. Further, the meaning of terms or words used in the specification and the claims should not be limited to the literal or commonly employed sense, but should be construed in accordance with the spirit of the disclosure to most properly describe the present disclosure.

The terminology used herein is for the purpose of describing particular various embodiments only and is not intended to be limiting of various embodiments. As used herein, the singular forms "a", "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

The present disclosure will now be described more fully with reference to the accompanying drawings, in which various embodiments of the present disclosure are shown. The present disclosure may, however, be embodied in many different forms and should not be construed as being limited to the various embodiments set forth herein, rather, these various embodiments are provided so that this disclosure will be thorough and complete, and will fully convey the present disclosure. Furthermore, a detailed description of other parts will not be provided not to make the present disclosure unclear. Like reference numerals in the drawings refer to like elements throughout.

The subject invention lies in a system for person identification and imposter detection by analyzing footfall generated seismic signals.

Figure 1:
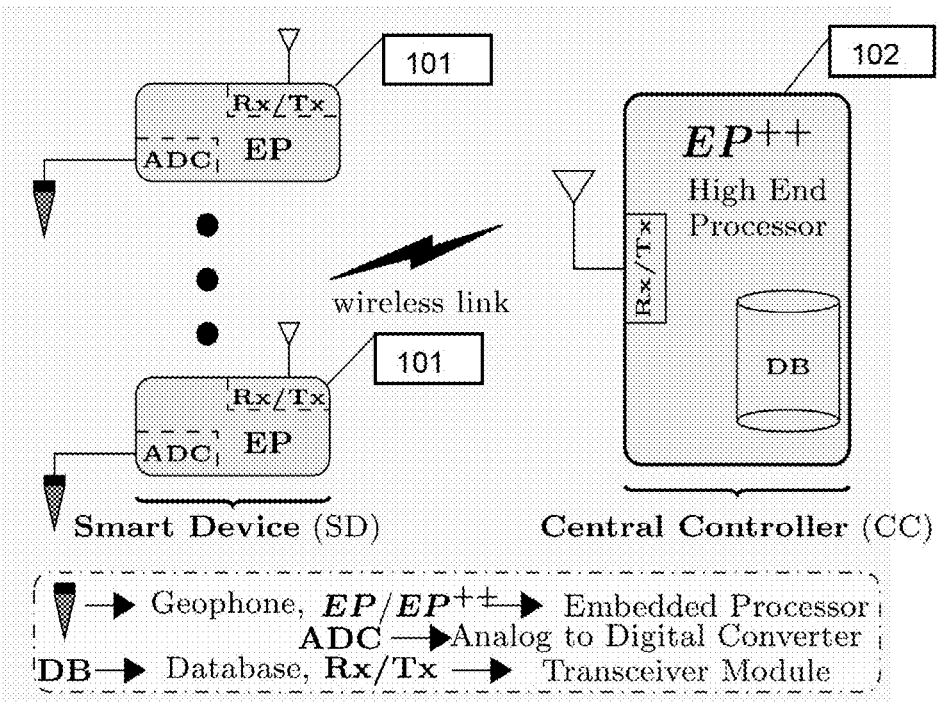
FIG. 1 illustrates a system architecture for human identification and imposter according to an embodiment of present invention.

According to an embodiment of the present invention, FIG. 1 illustrates a biometric authentication system for person identification and imposter detection using unsupervised learning based detection and extraction technique, USLEEM, said system comprising an array of smart devices (101) distributed over a zone to record seismic signals corresponding to a footfall of a person, a central controller (102) communicably coupled to the array of smart devices. Each smart device comprises at least one sensing module (1011) configured to detect a plurality of seismic signals generated from corresponding footfall of a person to generate a seismic event, an analog-to-digital converter module (1012) configured to convert detected raw analog seismic signals into digital signals, an event extraction module (1013) configured to split a seismic signal, of the plurality of said seismic signals, into N equal segments and extract, vectors corresponding to time domain and frequency domain features from each said segment of the N segments, cluster each of the said vectors into a clustered event, and store said clustered event. The smart device further comprises an identification module (1014) configured to identify either an imposter or a registered person.

According to an embodiment of the present invention, all the raw data acquisition, event extraction, person identification and imposter detection/classification happens in the smart device, SD. Final result related to person identification and impostor detection from all the SDs is stored to the database situated in Central controller.

A footfall is a short-lived event embedded on the noise of a seismic signal. If the entire signal is segmented in smaller chunks, most of the chunks will be void of footfall events. So, processing each chunk of the signal for human identification or imposter detection will lead to wastage of power and resource. So, it is very important to have a robust event detection and extraction technique.

Figure 2:
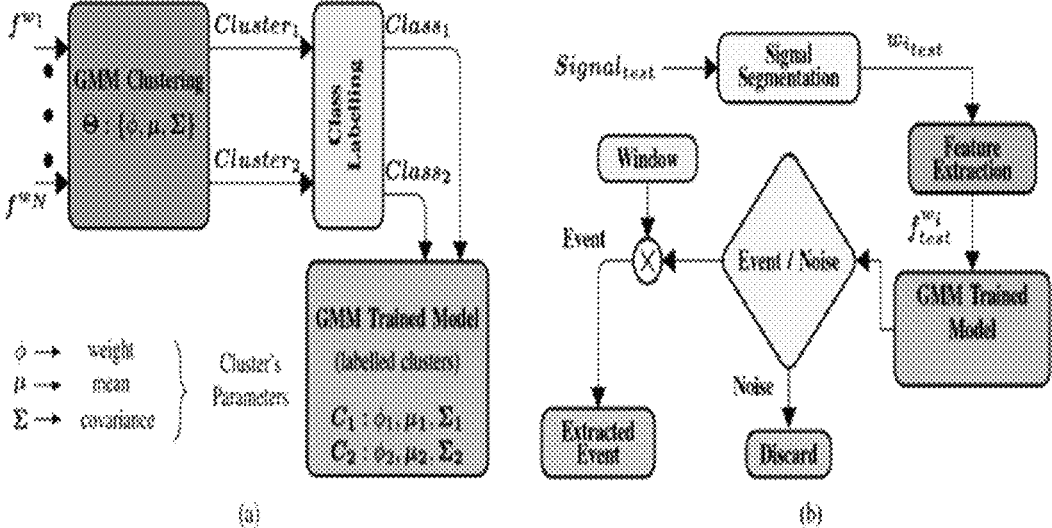
FIG. 2 illustrates overview of event detection and extraction technique USLEEM according to an embodiment of present invention.

According to another embodiment of the present invention, FIG. 2 illustrates an event detection and extraction technique to obtain the portion of the signal containing footfall event, the said technique comprising of the phases: training phase to cluster samples into two classes including footfall event and noise; and live phase.

A seismic signal (containing human footsteps) is split in N equal segments of length 220 ms. Time and frequency domain related features, referring to Table I, are extracted from each segment. The complete feature vector is represented by $$f^{w_i}\left(= [f_1^{w_i}, \ldots, f_5^{w_i}]\right),$$

where $$f_j^{w_i}$$

is the $j^{th}$ feature of $i^{th}$ segment (i=1, ..., N). Each feature vector $f^{w_i}$ serves as a single sample for the clustering technique.

TABLE I

| Feature Extracted from the $i^{th}$ segment Segment's Features | | | | |
|---|---|---|---|---|
| Statistical Features | | Spectral Features (Energy bins) | | |
| $f_1^{w_i}$ | $f_2^{w_i}$ | $f_3^{w_i}$ | $f_4^{w_i}$ | $f_5^{w_i}$ |
| std | kurtosis | 40-80 Hz | 80-120 Hz | 120-160 Hz |

According to an exemplary implementation of the present invention, in the training phase, Gaussian Mixture Model, GMM is used to cluster the samples into two classes, footfall event and noise (absence of an event). Gaussian Mixture Model (GMM) is a clustering method that models the distribution of the data samples as a weighted Gaussian sum. The distribution of a feature vector $f^{w_i}$ is given as $$\sum_{k=1}^{K} \phi_k \cdot N\left(f^{w_i} \mid \mu_k, \sum_k\right) \qquad (1)$$

where K is the number of clusters (2 in this scenario) and N is the number of training sample. Parameters $\phi_k$, $\mu_k$ and $\Sigma_k$ are the prior probability (weight), mean, and covariance matrix of the $k^{th}$ clusters. The parameter $\phi_k$ satisfies $0 \leq \phi_k \leq 1$ and $$\sum_{k=1}^{K} \phi_k \cdot N\left(f^{w_i} \mid \mu_k, \sum_k\right)$$

is the multivariate Gaussian distribution of the $i^{th}$ feature. The log-likelihood of the training samples are given by $$\ln p(F \mid \Theta) = \sum_{i=1}^{N} \ln\left\{\sum_{k=1}^{2} \phi_k \cdot N\left(f^{w_i} \mid \mu_k \sum_k\right)\right\} \qquad (2)$$

Where $F = [f^{w_1 T}, f^{w_2 T}, \ldots, f^{w_N T}]^T$ is the feature matrix and $\theta = \{\phi_1, \phi_2, \mu_1, \mu_2, \Sigma_1, \Sigma_2\}$. $\theta$ is obtained by maximizing Equation (2) using Expectation-Maximization (EM) algorithm.

The two sets of clusters ($C_1$ and $C_2$) produced by GMM are unlabeled. Each cluster is parameterized by a set of $\phi$, $\mu$ and $\Sigma$. The following equation is used to assign labels to the clusters.

$$Class = \begin{cases} C_1 \to Event, C_2 \to Noise: |\Sigma_{C_1}| > |\Sigma_{C_2}| \\ C_1 \to Noise, C_2 \to Event: |\Sigma_{C_2}| > |\Sigma_{C_1}| \end{cases} \qquad (3)$$

where $|\Sigma_{C_k}|$ is the determinant of the co-variance matrix of the $k^{th}$ clusters. The covariance of the features matrix of the noise cluster has lower variance as compared to that of the footfall event class.

Referring to FIG. 2(b), another embodiment of present invention discloses the live phase of the said technique, i.e. it includes the detection and extraction of footfall events from the seismic signal of a user, wherein the user may be a registered user or an imposter. A test signal Signal$_{test}$ of predefined length is segmented into equal parts (W$_{i_{test}}$ using a sliding window technique (size of the window and the overlapping ratio are set to 220 ms and 40). To predict the cluster ($C_1$ or $C_2$) of each segmented test signal Equation (4) is used.

$$Class = \begin{cases} C_1: p(C_1 \mid f_{test}^{w_i}) > p(C_2 \mid f_{test}^{w_i}) \\ C_2: p(C_2 \mid f_{test}^{w_i}) > p(C_1 \mid f_{test}^{w_i}) \end{cases} \qquad (4)$$

$$f_{test}^{w_i}$$

is the feature vector of the $i^{th}$ segment of the test signal and $$p\left(C_k \mid f_{test}^{w_i}\right)\left(= \phi_k \cdot N\left(f_{test}^{w_i} \mid \mu_{C_k}, \sum_{C_k}\right) \text{ for } k = 1, 2\right)$$

is the probability that $$f_{test}^{w_i}$$

belongs to class $C_k$.

As seen in FIG. 3(a), the results of event detection technique have been obtained and the footfall and noise portions of the seismic signal are labelled (0 as noise and 1 as an event) using the GMM method. The final signal is obtained by multiplying the labelled "1" segment of the signal with a Gaussian window. The center of the Gaussian window is placed at the location where the signal has the maximum amplitude within the segment.

In an exemplary implementation, the length of the Gaussian windows is considered to be 375 ms and the value of sigma is set to 4. These values are obtained by studying various footfall signals and rectangular window has been used for event extraction.

FIG. 4 illustrates the effect of the windowing technique on the frequency content of the footfall, and it can be observed that the footfall event obtained using rectangular window starts and ends abruptly. This abruptness in time domain leads to spectral leakages in the frequency domain and introduces unwanted high frequency harmonics. FIG. 4$b(i)$ illustrates spectrogram and FIG. 4$c(i)$ illustrates frequency spectrum of the event and the corresponding harmonics can be observed from these figures. This spectral leakage imparts noises in the features vector affecting the performance of the prediction algorithms. On the contrary, events obtained from Gaussian window, as in FIG. 4$a(ii)$, have smooth edges. These events are free from spectral leakages as illustrated in FIG. 4$b(ii)$ and FIG. 4$c(i)$. This enhances the quality of the feature vector and improves the performance of the classifiers.

One of the exemplary implementations of present invention discloses a comparative performance analysis among USLEEM and the existing techniques UREDT and Adap-Th in terms of Person identification and imposter Detection. The same can be found in Tables II, III and IV below.

TABLE II

| Extracted features from a single footfall event | | | | | |
|---|---|---|---|---|---|
| Time Domain | std skewness kurtosis event length | Hilbert Transform | mean std skewness kurtosis | Frequency Energy Bins (2 Hz.) | 0 to 250 Hz. |

In an exemplary implementation, a dataset consisting labelled footsteps from 8 different individuals (four males and four female) is used to analyse the performance of the technique for person identification and imposter detection. The seismic signals generated by footfalls were recorded, as different volunteers walked around a geophone. Footfall generated seismic signals were recorded with a 16 bit analog to digital converter (ADC), as each volunteer walked around a geophone for five minutes. The sampling frequency of the ADC was 8 kHz. Dataset of an individual was recorded at a time. The entire experiment was repeated 12 times over a month. So, each individual class has almost 1 hour of seismic signal. The sensitivity and gain of the geophone used in this study are 2.88 V/mm/see and 100. Each individual class has almost 1 hour of seismic signal in the dataset. It was collected over a span of 1 month. The event extraction techniques USLEEM, (UREDT+event extraction), and Adap-Th are used to extract individual footfall events from the entire dataset.

TABLE III

| Dataset created using USLEEM, UREDT and Adap-Th technique (j = 2, 3, 5, 7, 10) | | | | |
|---|---|---|---|---|
| | Footstep | Number of footsteps sample | | |
| Dataset Name | per sample | USLEEM | UREDT | Adap-Th |
| Dataset$_i$ | 1 | 47586 | 46645 | 46549 |
| Dataset$_j$ | j | $\dfrac{47586}{j}$ | $\dfrac{46645}{j}$ | $\dfrac{46549}{j}$ |

TABLE IV

| Details of the scenarios used for performance analysis of imposter detection | | | | |
|---|---|---|---|---|
| SN | Scenario | # Registered user | # Imposters | # Imposters detection problems |
| 1 | 1 | 3 | 2 | 56 |
| 2 | | | 3 | 56 |
| 3 | | | 4 | 56 |
| 4 | | | 5 | 56 |
| 5 | 2 | 4 | 2 | 70 |
| 6 | | | 3 | 70 |
| 7 | | | 4 | 70 |
| 8 | 3 | 5 | 2 | 56 |
| 9 | | | 3 | 56 |

Table III displays the total number of footsteps extracted by the three event extraction techniques. Each footfall event, (referring to Table II) is treated as a single sample and the final dataset (Dataset$_1$) is created by extracting features from them. A few more datasets are created by averaging the features from consecutive footfalls e.g. in Dataset$_j$ features from j consecutive footsteps are averaged and are treated as a single sample. In this way, five new datasets are created by assigning j to 2,3,4,7, and 10.

Feature extraction plays a vital part in a biometric system. Classifiers' accuracy depends on the distinctiveness of features among different individuals. Time and frequency domain features are calculated for each of the footfall events (obtained from the event extraction technique). Mean, standard deviation, skewness, and kurtosis of the event make the time domain features. Length of the footfall event is also considered as an important feature. The length of a footfall is directly related to the shape and structure of the foot of an individual. Feature set also includes spectral energy of frequency bins of size 2~Hz from 0 to 250 Hz. It has been observed that there is no significant information in the footfall signal beyond 250~Hz.

Person Identification and Imposter Detection

Different multiclass supervised machine learning (ML) algorithms (SVM-Linear (SVM-Lin), SVM Gaussian (SVM-RBF), Logistic Regression (LR), Linear Discriminant Analysis (LDA) and k-Nearest Neighbor (kNN) are used for person identification. Each individual represents a single class in the ML algorithm. The datasets are normalized before training and testing, and 5-fold cross validation is carried out to avoid underfitting and overfitting. The hyper parameters of the classifiers (C for SVM-Lin, and C and $\gamma$ for SVM-RBF) are obtained from grid search. The performance parameters for the algorithms include accuracy, precision, recall, and F1 score. It has been observed by researchers, combining features of multiple consecutive footsteps or discarding footsteps of low signal to noise ratio (SNR) increases the overall prediction accuracy. The required number of consecutive footsteps and the active area (sensing region) of a seismic sensor determine the total number of sensors required for a specific system. So, there is always a tendency to achieve high accuracy by using optimal number of footsteps. This reduces the overall infrastructure of the system and also decreases the prediction time (which may be very crucial in border areas and high security zones). So, the six datasets (Dataset$_1$ . . . . Dataset$_{10}$), referring to Table III, are used to study the performance of the classifiers as number of footsteps per sample are increased.

Detection of Non-Registered User (Imposter)

The most challenging part in footfall based biometric system is imposter (intruder) detection. The main drawback of the above-mentioned ML classifiers is that they always assign footfalls of an unknown person (whose data were not used to train the model) to one of the predefined classes. The existing system only works when the individuals (classes) remain the same for training and testing scenarios. To overcome this problem, an imposter detection technique based on one-class/unary classifiers capable of predicting the presence or absence of an individual within the pre-registered dataset has been implemented. Using this technique, the system first detects the presence of an individual's footfall in the trained feature space. Classification for person identification is carried out only in case of registered users. Otherwise, it gives an intruder detected warning signal.

Two, one class machine learning models namely one class support vector machine (OC-SVM) and support vector data description (SVDD) are used for imposter detection. The one class classifiers (OC-SVM and SVDD) generate binary output i.e. +1 if the test sample lies within the decision boundary or −1 if the sample is an outlier. In imposter detection scenario data of each registered user are used to train individual one class models. If there are r number of registered users, there will be r number of trained one class models. The test sample is predicted as imposter (anomaly) if all the trained one class classifiers return −1 i.e. the test sample is anomalous to all the one class classifiers. Eqn. 5 shows the decision rule used for predicting imposters.

$$\text{Test-Sample} = \begin{cases} \text{Imposter, } \forall \text{ Trained Model} = -1 \\ \text{Registered User, otherwise} \end{cases} \quad (5)$$

Three main scenarios, as in Table III, uses the footfall dataset of 8 individuals to calculate the performance of the techniques for imposter detection. In each scenario, r number of classes is treated as registered users (r={3, 4, 5}). Each scenario is further divided into sub-scenarios. These sub-scenarios are created by fixing the number of registered users and varying the number of imposters from 2 to 8−r. Each sub-scenario is further subdivided into $^8C_r$ combinations of imposter detection problem to compute the robustness of the techniques. It is done to select all sets of r combinations (order of selection does not matter) of classes as registered users. The imposters are selected from the rest. Cases where the number of registered users is less than 3, or the number of imposters is less than 2 were not considered as these scenarios do not resemble realistic situation. The final performance of the techniques corresponding to each scenario is calculated by averaging the results obtained from all sub-scenarios. In the training phase, only the data of registered users are available. The data of the imposters are completely unseen by the trained machines and are only used during the live phase (which resemblance real scenario cases). Fivefold cross validation is carried out in each of the imposter detection problems.

The performance of human identification and imposter detection techniques, referring to Table V, are calculated using the dataset.

TABLE V

Performance of different classifiers used for person identification with varying footsteps per sample

| Classifiers | Number of Footsteps/sample | | | | | |
|---|---|---|---|---|---|---|
| Accuracy (%) | 1 | 2 | 3 | 5 | 7 | 10 |
| SVM Lin. | 79.00 | 88.4 | 91.97 | 94.97 | 96.72 | 97.39 |
| SVM RBF | 83.47 | 90.51 | 93.06 | 95.71 | 96.79 | 97.54 |
| LR | 73.48 | 84.37 | 88.23 | 93.62 | 96.07 | 96.82 |
| LDA | 67.86 | 78.75 | 84.63 | 89.58 | 93.24 | 95.54 |
| kNN | 71.86 | 80.53 | 84.72 | 88.23 | 91.21 | 94.24 |

Person Identification

Figure 5:
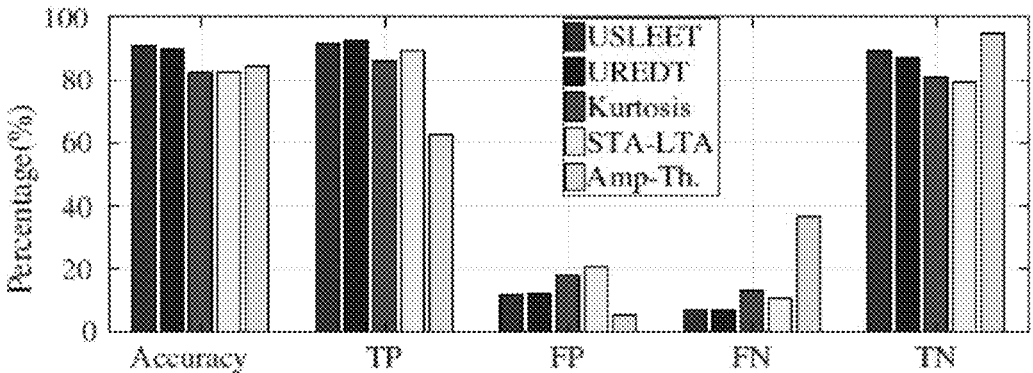
FIG. 5 illustrates performance comparison of event detection techniques according to the present invention.

The first phase of a person identification technique is event detection and extraction. Event detection capability of USLEEM is compared with existing techniques like UREDT, Adap-Th, amplitude threshold (Amp-Th.), and kurtosis based technique. Event extraction technique Adap-Th uses STA-LTA for event detection. FIG. 5 shows the performance of all the techniques in detecting seismic events. An annotated dataset containing 1165 footfall events is used for calculating the performance parameters. USLEEM and UREDT outperform the rest of the techniques. Unlike others, USLEEM and UREDT do not require any tuning parameter or prior knowledge of the data. Both of them use a GMM based clustering technique in the training phase. However, in the final prediction phase, USLEEM uses the trained GMM model obtained from the training phase. On the other hand, UREDT trains an SVM model with 135 features of the footfall event. So, UREDT is computationally more expensive and memory hungry than USLEEM.

The performance of different classifiers (for human identification) with variation in number of footsteps per sample is presented in Table V. Events are extracted using the USLEEM technique. It is important to achieve high prediction accuracy from few footfalls, as it reduces prediction time, saves energy and is economical. The sensing range of geophones on concretes is 2~m to 2.5~m. So, more than one geophone will be required for applications that need very high prediction accuracy. As the system will demand a large number of footsteps per sample. It can be observed, referring to Table V, that in case of 10 footsteps/sample the performance of all the classifiers is almost the same. However, in 1 footstep/sample scenario SVM-RBF outperforms the rest and achieves an accuracy of 83.47% which is 25.61% higher than LDA (which performs worst). The Gaussian kernel of SVM-RBF increases the dimension of the feature space (disjointing the classes) before performing classification. The feature space of the classes is somewhat overlapped in 1~footstep/sample scenario and they slowly become disjoint as number of footsteps per sample increase.

Figure 6:
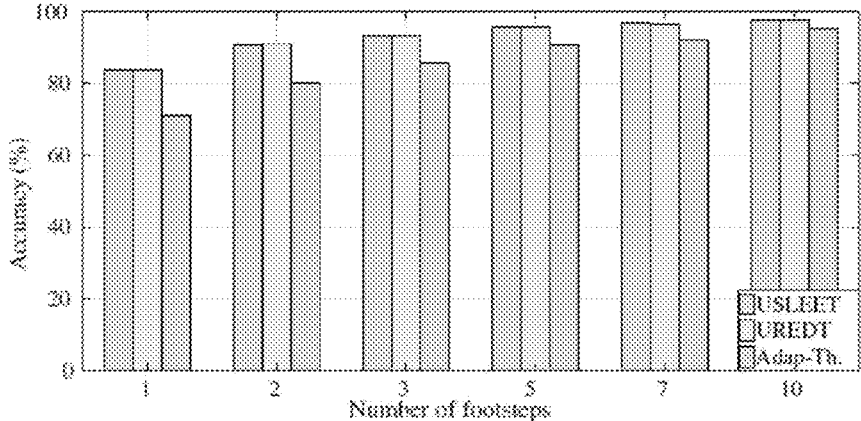
FIG. 6 illustrates performance of SVM-RBF in person identification as different event extraction techniques (USLEEM, UREDT, and Adap-Th) are used according to one of the embodiment of present invention.

FIG. 6 exhibits the accuracy (person identification) obtained by SVM-RBF when different event extraction techniques (USLEEM, UREDT, and Adap-Th) are used. It is observed that in all cases USLEEM and UREDT outperform Adap-Th Identification accuracy of 90% is achieved by USLEEM and UREDT in 2~footstep/sample scenario, whereas Adap-Th requires 5 footsteps/sample to attain 90%. Better performance of USLEEM and UREDT is due to the use of a Gaussian window for event extraction. Adap-Th technique uses a rectangular window for extraction of final footfall event. The spectral leakage of the rectangular window affects the frequency domain features of the footfall. The rate of misclassification is higher in Adap-Th technique as most of the features for person identification, referring to Table II, are created from the frequency domain.

Figure 7:
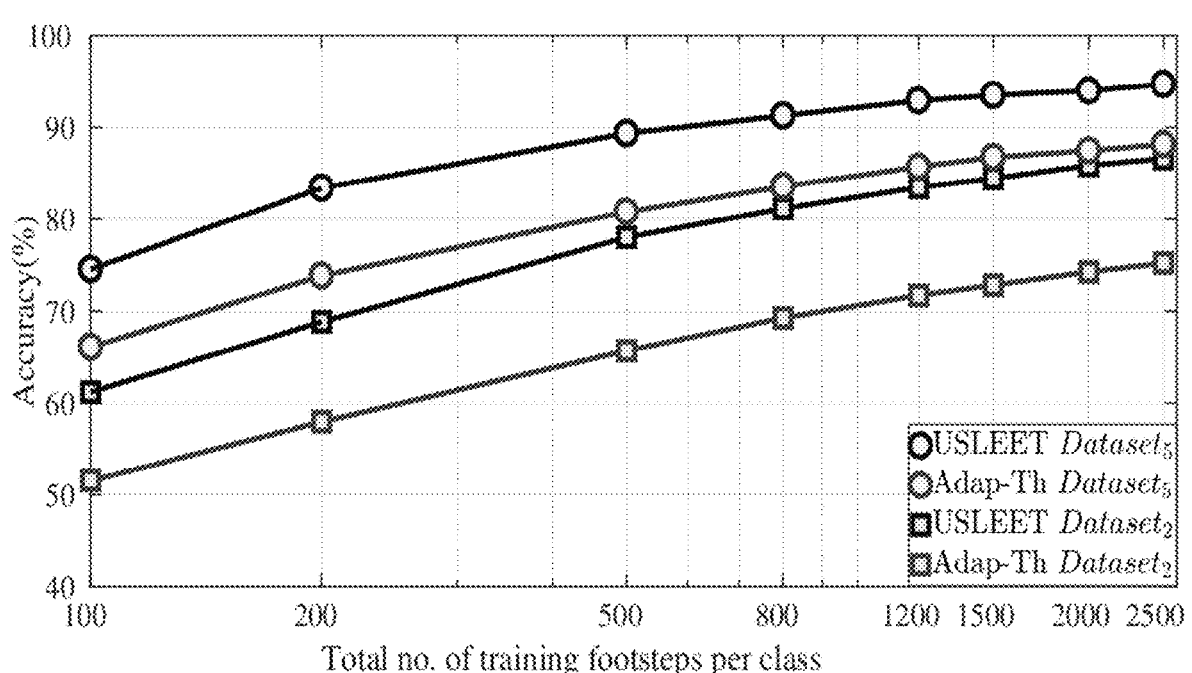
FIG. 7 illustrates learning curve of SVM-RBF obtained using USLEEM and Adap-Th as event extracted techniques according to one of the embodiment of present invention.

FIG. 7 shows the learning curve of SVM-RBF obtained using USLEEM and Adap-Th technique. Learning curves are used to find the minimum number of training samples required by classifiers to attain a certain accuracy. From an implementation point of view, it's very important to know the exact number of footsteps required per class (individual) to train the model. It is observed, referring to FIG. 7, that USLEEM requires 800 footsteps of training samples per class to achieve an identification accuracy of 91%, and Adap-Th needs 2500 footsteps of training samples per class to attain an accuracy of 88% (with dataset$_5$). So, for achieving an identification accuracy of approximately 90%, an individual need to walk around the sensor (in the training phase) for 5 minutes when USLEEM is used and for 25 minutes in case of Adap-Th (assuming a normal human being takes 1 min to walk 100 footsteps). A comparison of the learning curves of SVM-RBF with dataset$_2$ and dataset$_5$ is also carried out. Samples containing more footsteps trend to achieve higher accuracy with a lower number of training samples. 10% to 15% improvement in accuracy of SVM-RBF is observed when 5 footsteps/sample (dataset$_5$) are used in place of 2 footsteps/sample (dataset$_2$). Confusion matrix of SVM-RBF (applied on dataset$_2$) is shown in Table VI.

TABLE VI

Confusion matrix of person identification
obtained using SVM-RBF on Dataset$_2$.

| Actual | P1 | 0.91 | 0.02 | 0.03 | 0.04 | 0.00 | 0.00 | 0.01 | 0.00 |
|--------|-----|------|------|------|------|------|------|------|------|
| Class | P2 | 0.04 | 0.87 | 0.01 | 0.06 | 0.00 | 0.00 | 0.01 | 0.01 |
| | P3 | 0.04 | 0.00 | 0.92 | 0.02 | 0.00 | 0.00 | 0.01 | 0.01 |
| | P4 | 0.03 | 0.03 | 0.03 | 0.87 | 0.00 | 0.00 | 0.02 | 0.02 |
| | P5 | 0.00 | 0.00 | 0.00 | 0.00 | 0.89 | 0.09 | 0.00 | 0.02 |
| | P6 | 0.00 | 0.00 | 0.01 | 0.00 | 0.04 | 0.88 | 0.00 | 0.07 |
| | P7 | 0.01 | 0.00 | 0.02 | 0.01 | 0.00 | 0.00 | 0.96 | 0.00 |
| | P8 | 0.01 | 0.00 | 0.00 | 0.04 | 0.01 | 0.04 | 0.00 | 0.90 |
| | | P1 | P2 | P3 | P4 | P5 | P6 | P7 | P8 |
| | | | | | Predicted Class | | | | |

Imposter Detection Using One Class Classifiers

Figure 8:
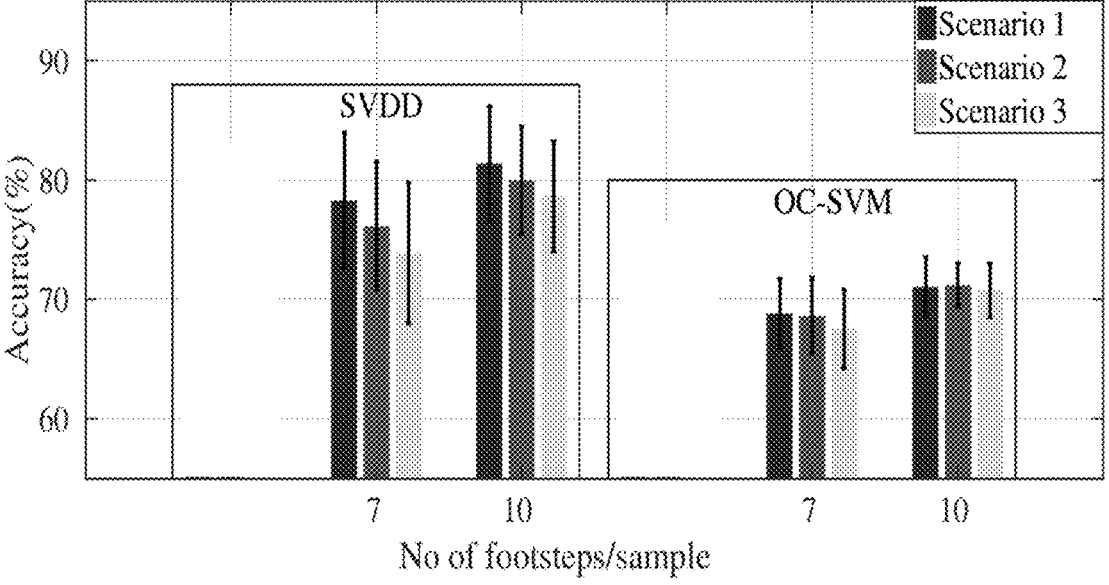
FIG. 8 illustrates performance of imposter detection using OC-SVM and SVDD in three different imposter detection scenarios according to one of the embodiment of present invention.

A comparative analysis, referring to FIG. 8, of the two one class classifiers (OC-SVM and SVDD) used for imposter detection is illustrated. The hyper-parameters (C=1, γ=0.04 and v=0.2) for both the classifiers are obtained using grid search. The prediction accuracies of registered and non-registered (imposters) users, referring to FIG. 8, for three different scenarios achieved by OC-SVM and SVDD. It also presents the variation in performance as the number of footsteps per sample is increased from 7 to 10. It can be noticed that SVDD outperforms OC-SVM in all the three scenarios and the performance of the classifiers improves with the increase in the number of footsteps per sample. In all the three scenarios SVDD achieves a prediction accuracy of 76% to 80% with 10 footsteps per samples.

$$FPR = \frac{FP}{FP+TN}, TPR = \frac{TP}{TP+FN} \tag{6}$$

SVDD encloses the dataset with a spherical boundary and OC-SVM draws a hyperplane between the dataset of the training class and the origin. If r is the number of registered users, SVDD has r spherical boundaries and OC-SVM has r hyperplane on the feature space. The r hyperplanes in the feature space overlap among themselves and results in poor performance of OC-SVM. The hyperspheres of SVDD are more disjoints (non-overlapped) than the hyperplanes of OC-SVM due to its spherical nature. ROC curves of SVDD and OC-SVM are obtained from scenario 2, referring to Table IV and FIG. 9, using 10 footsteps per sample (Dataset$_{10}$). SVDD and OC-SVM are discrete classifiers (return only the class label in the output), so each class, irrespective of registered user and imposter, corresponds to a single point (FPR, TPR) in the ROC space. FPR (false positive rate) and TPR (true positive rate) corresponding to a class is calculated using where FP is false positive, TN is true negative, TP is true positive and FN is false negative. The coordinate (0, 1) in the ROC graph represents a perfect classifier. A classifier is better than another, if it lies north-west to the other in the ROC space. So, the ROC curve of SVDD is much better than OC-SVM for both the classes.

Performance parameters (accuracy, precision, recall, and F1 score) of SVDD for imposter detection are presented in Table VII. The mean and standard deviation are calculated by averaging the performance parameters of all the sub scenarios. Imposter detection accuracy decreases slightly (4% for SVDD and 1% for OC-SVM) from scenario 1 to scenario 3 when dataset$_{10}$ is used. An increase in the number of registered user results in large overlapping of different classes in the feature set. However, for both the techniques the overall accuracy and individual F1 score of the classes almost remain the same as number of imposters increases for all the three scenarios. This makes the system robust in imposter detection.

TABLE VII

Performance of SVDD for different imposter detection scenarios obtained using Dataset$_{10}$.

| | # Registered | | | Performance Parameters | | | | | |
|----------|------|------------|----------|------------|----------|------------|----------|------------|----------|
| | | | Overall | Precision | | Recall | | F1 | |
| Scenario | User | Parameters | Accuracy | Registered | Imposter | Registered | Imposter | Registered | Imposter |
| 1 | 3 | Mean | 80.22 | 85.88 | 76.63 | 72.96 | 87.47 | 78.58 | 81.51 |
| | | Std | 2.48 | 4.13 | 1.82 | 2.35 | 4.30 | 2.42 | 2.62 |
| 2 | 4 | Mean | 78.31 | 82.09 | 75.83 | 73.46 | 83.16 | 77.26 | 79.14 |
| | | Std | 2.74 | 4.35 | 2.08 | 2.50 | 4.94 | 2.53 | 3.03 |
| 3 | 5 | Mean | 76.19 | 78.70 | 74.57 | 73.25 | 79.13 | 75.62 | 76.58 |
| | | Std. | 2.77 | 3.52 | 2.69 | 3.21 | 4.29 | 2.72 | 2.97 |

TABLE VIII

Performance of OC-SVM for different imposter detection scenarios obtained using Dataset$_7$.

| # | | | | Performance Parameters | | | | | | |
| Scenario | Registered User | # Imposter | | Overall Accuracy | Precision Registered | Precision Imposter | Recall Registered | Recall Imposter | F1-Score Registered | F1-Score Imposter |
|---|---|---|---|---|---|---|---|---|---|---|
| 1 | 3 | 2 | Mean | 75.65 | 77.14 | 75.29 | 75.19 | 76.11 | 75.71 | 75.27 |
| | | | Std. | 5.29 | 7.89 | 3.19 | 2.13 | 10.37 | 4.12 | 6.70 |
| | | 3 | Mean | 75.74 | 76.52 | 75.70 | 75.49 | 75.99 | 75.71 | 75.58 |
| | | | Std. | 3.39 | 4.99 | 2.29 | 2.41 | 6.63 | 2.78 | 4.18 |
| | | 4 | Mean | 75.23 | 75.74 | 75.30 | 74.98 | 75.47 | 75.12 | 75.18 |
| | | | Std. | 2.14 | 3.21 | 1.49 | 1.59 | 4.21 | 1.77 | 2.61 |
| | | 5 | Mean | 75.37 | 76.13 | 75.19 | 74.45 | 76.30 | 75.05 | 75.56 |
| | | | Std. | 1.04 | 1.26 | 1.35 | 1.91 | 1.72 | 1.15 | 1.07 |
| | | Average | Mean | 75.50 | 76.38 | 75.37 | 75.03 | 75.97 | 75.40 | 75.40 |
| | | | Std. | 2.97 | 4.34 | 2.08 | 2.01 | 5.73 | 2.46 | 3.64 |
| 2 | 4 | 2 | Mean | 73.11 | 72.83 | 74.22 | 76.21 | 70.00 | 74.17 | 71.66 |
| | | | Std. | 4.83 | 6.36 | 3.51 | 2.66 | 9.15 | 3.75 | 6.32 |
| | | 3 | Mean | 72.53 | 71.86 | 73.77 | 75.51 | 69.56 | 73.45 | 71.38 |
| | | | Mean | 2.76 | 3.59 | 2.16 | 1.94 | 5.25 | 2.18 | 3.57 |
| | | 4 | Std. | 72.68 | 71.86 | 73.92 | 75.40 | 69.96 | 73.46 | 71.75 |
| | | | Mean | 1.34 | 1.52 | 1.45 | 1.68 | 2.24 | 1.25 | 1.57 |
| | | Average | Mean | 72.77 | 72.18 | 73.97 | 75.71 | 69.84 | 73.69 | 71.60 |
| | | | Std. | 2.98 | 3.83 | 2.37 | 2.09 | 5.55 | 2.39 | 3.82 |
| 3 | 5 | 2 | Std. | 70.46 | 69.31 | 72.32 | 75.64 | 65.28 | 72.14 | 68.35 |
| | | | Mean | 3.88 | 4.65 | 3.13 | 2.37 | 7.13 | 2.97 | 5.15 |
| | | 3 | Std. | 70.99 | 69.60 | 73.01 | 76.11 | 65.88 | 72.58 | 69.09 |
| | | | Mean | 1.21 | 1.34 | 1.33 | 1.50 | 2.09 | 1.08 | 1.49 |
| | | Average | Mean | 70.73 | 69.45 | 72.66 | 75.88 | 65.58 | 72.36 | 68.72 |
| | | | Std. | 2.54 | 2.99 | 2.23 | 1.93 | 4.61 | 2.03 | 3.32 |

Overall, the system records and analyses footfall generated seismic waveforms. The unsupervised learning-based event detection and extraction technique USLEEM outperforms the existing techniques and is computationally cheaper than UREDT. Using SVM-RBF with USLEEM we were able to achieve an identification accuracy of 90.6% (features extracted from two consecutive footsteps), thereby identifying humans as registered users and imposters and making the system suitable for certain applications where the prior information of imposters is not available.

According to an embodiment of the present invention, a method for person identification and imposter detection comprises steps of detection and extraction (201, 202; 301, 302) of seismic signals generated from corresponding footfalls, by means of unsupervised learning based detection and extraction module (USLEEM); and detection and identification of imposter and/or registered users (304, 305, 306, 307) respectively by means of an identification module. The said step of detection and extraction of seismic signals generated from corresponding footfalls comprising at least one training phase including-splitting (202) each of said seismic signals, into N equal segments, extracting (202) feature vectors (FE-I) corresponding to time domain and frequency domain features from each of said segment of the N segments, clustering (202) each of the said feature vectors into a clustered event so as to form at least one trained model of USLEEM, and storing of the said trained model. The step of detection and extraction of seismic signals generated from corresponding footfalls further comprising at least one live phase including-splitting (301) each of said seismic signals, into N equal segments, extracting (302), feature vectors (FE-I) corresponding to time domain and frequency domain features from each of said segment of the N segments and detecting footfalls from the extracted featured vectors (FE-I) thereafter feeding (303) it to the trained model. The step of detection and identification of imposter and/or registered users respectively is performed by means of an identification module, said method steps including-detection (307) of at least one imposter, by means of One-Class machine learning model when feature vectors (FE-II) obtained from the extracted footfalls of live phase are fed to the One-Class model and identification of registered users, and identification (306) of registered users, from feature vectors (FE-II) obtained from the extracted footfalls of live phase, by means of multi-class machine learning model. Gaussian Mixture Model, GMM, clustering facilitates clustering each of the said feature vectors into a clustered event. Each cluster is parameterized by a set of $\phi$, $\mu$, and $\Sigma$ and the method further comprises classifying said clustered event into a footfall event and noise by $$\text{Class} = \begin{cases} C_1 \rightarrow \text{Event, } C_2 \rightarrow \text{Noise: } |\Sigma_{C_1}| > |\Sigma_{C_2}| \\ C_1 \rightarrow \text{Noise, } C_2 \rightarrow \text{Event: } |\Sigma_{C_2}| > |\Sigma_{C_1}| \end{cases}$$

where $|\Sigma_{C_k}|$ is the determinant of the co-variance matrix of the $k^{th}$ clusters. During the live phase, each of the N segments of the footfall generated seismic signals are classified by, $$\text{Class} = \begin{cases} C_1: \; p(C_1 \mid f_{test}^{wi}) > p(C_2 \mid f_{test}^{wi}) \\ C_2: \; p(C_2 \mid f_{test}^{wi}) > p(C_1 \mid f_{test}^{wi}) \end{cases}$$

where $$f_{test}^{wi}$$

is the feature vector of the $i^{th}$ segment of a test signal Signal$_{test}$.

$$p\left(C_k \mid f_{test}^{w_i}\right)\left(= \phi_k \cdot N\left(f_{test}^{w_i} \mid \mu_{C_k}, \sum_{C_k}\right) \text{ for } k = 1, 2\right)$$

for k=1,2) is the probability that $$f_{test}^{w_i}$$

belongs to class $C_k$, test signal $\text{Signal}_{test}$ is the seismic signal generated by an imposter or a registered user during the live phase and it is segmented into equal parts ($W_{i_{test}}$).

Some of the non-limiting advantages of seismic sensor based biometric system are:

1. Individuals are not required to orient or position themselves in a special manner.
2. Easy implementation, sensor data are less affected by environmental parameters, and the sensor is easily camouflageable.
3. Beneficial for sentries posted in high-security zones (bureaucratic building), military camps, and army check posts.

Although a method for person identification and imposter detection using unsupervised learning-based detection and extraction technique, USLEEM, a smart device implementing the method and a biometric authentication system thereof has been described in language specific to structural features, it is to be understood that the embodiments disclosed in the above section are not necessarily limited to the specific methods or devices described herein. Rather, the specific features are disclosed as examples of implementations of method for person identification and imposter detection using unsupervised learning-based detection and extraction technique, USLEEM, a smart device and a biometric authentication system thereof.

We claim:

1. A method for person identification and imposter detection, the method, executed by a smart device, comprising:

during a training phase;

detecting, by at least one sensing module of the smart device, a plurality of seismic signals generated from behavioral properties of a person, wherein the behavioral properties of the person comprise at least a footfall signature of the person, the footfall signature associated to corresponding footfalls of the person, by means of unsupervised learning based detection and extraction module (USLEEM) to generate a seismic event;

converting, by an analog-to-digital converter module of the smart device, the detected plurality of seismic signals, the plurality of seismic signals being analog signals, into digital signals;

splitting, by an event extraction module of the smart device, each digital seismic signal of plurality of digital seismic signals into N equal segments;

extracting, for the each digital signal of the plurality of digital signals, by the event extraction module, first feature vectors (FE-I) corresponding to time domain and frequency domain features from each segment of the N equal segments;

clustering, by the event extraction module, each of the first feature vectors (FE-I) between clustered events without using predefined thresholds, using a Gaussian Mixture Model (GMM), wherein one cluster represents footfall events, and another cluster represents noise events, to form at least one trained GMM based model capable of distinguishing the footfall events from the noise events based on one or more statistical properties;

multiplying the each segment of the N equal segments classified as the footfall events with a Gaussian window centered at segment's peak amplitude to obtain smooth and spectrally consistent footfall signals;

extracting, from the each resulting smooth and spectrally consistent footfall signal, second feature vectors (FE-II), corresponding to refined time domain and frequency domain features, to further train:

a plurality of one-class learning models, each trained with the second feature vectors (FE-II) of an individual registered user to enable imposter detection by modelling only user specific class; and a multi-class learning model using the second feature vectors (FE-II) to associate footfall signatures with corresponding registered users; and storing the trained GMM based model;

during a live phase;

detecting, by the sensing module, a plurality of new seismic signals generated from one or more footfalls during a user activity, the plurality of new seismic signals being analog signals;

converting, by the analog-to-digital converter module, each of the detected plurality of new analog seismic signals into new digital signals;

splitting, by the event extraction module of the smart device, each new digital seismic signal of plurality of new digital seismic signals into N equal segments;

extracting, for the each new digital signal of the plurality of new digital signals, by the event extraction module, first feature vectors (FE-I) corresponding to time domain and frequency domain features from each segment of the N equal segments;

clustering, using the trained GMM based model, each segment of the N equal segments as a footfall event or a noise event based on the each of the first feature vectors (FE-I);

multiplying the each segment of the N equal segments classified as the footfall events with a Gaussian window centered at segment's peak amplitude to obtain smooth and spectrally consistent footfall signals;

extracting, from the each resulting smooth and spectrally consistent footfall signal, second featured vectors (FE-II), corresponding to refined time domain and frequency domain features;

feeding each of the second featured vectors (FE-II) to the trained plurality of one-class models;

detecting, by the trained plurality of one-class learning models, an imposter, when the each of the second feature vectors (FE-II) are identified as outliers by the all trained plurality of one-class learning models, to return a binary output of −1; and identifying, by the multi-class learning model, a registered user, from when the each of the second feature vectors (FE-II) are classified into predefined user class corresponding to the registered user.

2. The method as claimed in claim 1, wherein the trained GMM based model clustering comprises:

classifying the cluster with a higher variance to the footfall events and classifying the cluster with a lower variance to the noise events facilitates clustering each of the first feature vectors (FE I) into the clustered event.

3. The method as claimed in claim 2, wherein each of the footfall events cluster and the noise events cluster is parameterized by the one or more statistical properties comprising at least a set of $\varphi$, $\mu$, and $\Sigma$, wherein to classify and label the cluster with the higher variance and the lower variance to the footfall events or the noise events respectively comprises utilizing the equation:

$$\text{Class} = \begin{cases} C_1 \rightarrow \text{Event}, C_2 \rightarrow \text{Noise: } |\Sigma_{C_1}| > |\Sigma_{C_2}| \\ C_1 \rightarrow \text{Noise}, C_2 \rightarrow \text{Event: } |\Sigma_{C_2}| > |\Sigma_{C_1}| \end{cases}$$

where $|\Sigma_{C_k}|$ is determinant of co-variance matrix of kth clusters.

4. The method as claimed in claim 1, wherein during the live phase, the each of the N equal segments of the footfall events generated seismic signals are classified by:

$$\text{Class} = \begin{cases} C_1: p(C_1 \mid f_{test}^{w_i}) > p(C_2 \mid f_{test}^{w_i}) \\ C_2: p(C_2 \mid f_{test}^{w_i}) > p(C_1 \mid f_{test}^{w_i}) \end{cases}$$

where $$f_{test}^{w_i}$$

is the feature vector of the $i^{th}$ segment of a test signal $\text{Signal}_{test}$, $$p(C_k | f_{test}^{w_i})( = \varphi C_k N(f_{test}^{w_i} | \mu_{C_k}, \Sigma_{C_k}) \text{for } k = 1.2)$$

is a probability that $$f_{test}^{w_i}$$

belongs to class $C_k$, test signal $\text{Signal}_{test}$ is the seismic signal generated by the imposter or the registered user during the live phase and the test signal $\text{Signal}_{test}$ is segmented into equal parts ($w_{i_{test}}$).

5. A smart device for person identification and imposter detection, wherein the smart device comprises:
  at least one sensing module to detect a plurality of seismic signals generated from behavioral properties of a person, wherein the behavioral properties of the person comprise at least a footfall signature of the person, the footfall signature associated to corresponding footfalls of the person to generate a seismic event;
  an analog-to-digital converter module to convert the detected plurality of seismic signals, the plurality of seismic signals being analog signals, into digital signals;
  an event extraction module to:
    split each digital seismic signal, of plurality of digital seismic signals, into N equal segments;
    extract, for the each digital signal of the plurality of digital signals, first feature vectors (FE-I) corresponding to time domain and frequency domain features from each segment of the N equal segments;
  cluster, each of the first feature vectors (FE-I) between clustered events without using predefined thresholds, using a Gaussian Mixture Model (GMM), wherein one cluster represents footfall events, and another cluster represents noise events, to form at least one trained GMM based model capable of distinguishing the footfall events from the noise events based on one or more statistical properties;
  multiply the each segment of the N equal segments classified as the footfall events with a Gaussian window centered at segment's peak amplitude to obtain smooth and spectrally consistent footfall signals;
  extract, from the each resulting smooth and spectrally consistent footfall signal, second feature vectors (FE-II), corresponding to refined time domain and frequency domain features, to further train:
    a plurality of one-class learning models, each trained with the second feature vectors (FE-II) of an individual registered user to enable imposter detection by modelling only user specific class; and
    a multi-class learning model using the second feature vectors (FE-II) to associate footfall signatures with corresponding registered users; and
  store the trained GMM based model; and
an identification module to detect an imposter and/or to identify a registered user during a live phase comprising user activity, wherein the imposter is detected if each of second feature vectors (FE-II) obtained during the user activity are identified as outliers by the all trained plurality of one-class learning models, and wherein if the each of the second feature vectors (FE-II) obtained during the user activity are not identified as outliers by any of the all trained plurality of one-class learning models, the registered user is identified by the multi-class learning model, wherein the each of the second feature vectors (FE-II) are classified into predefined user class corresponding to the registered user.

6. A biometric authentication system for person identification and imposter detection, the biometric authentication system comprising:
  an array of smart devices distributed over a pre-determined zone; and
  a central controller communicably coupled to the array of smart devices, wherein each smart device of the array of smart devices comprises:
  at least one sensing module to detect a plurality of seismic signals generated from behavioral properties of a person, wherein the behavioral properties of the person comprise at least a footfall signature of the person, the footfall signature associated to corresponding footfalls of the person to generate a seismic event;
  an analog-to-digital converter module to convert the detected plurality of seismic signals, the plurality of seismic signals being analog signals, into digital signals;
  an event extraction module to:
    split each digital seismic signal, of plurality of digital seismic signals, into N equal segments;
    extract, for the each digital signal of the plurality of digital signals, first feature vectors (FE-I) corresponding to time domain and frequency domain features from each segment of the N equal segments;

cluster, each of the first feature vectors (FE-I) between clustered events without using predefined thresholds, using a Gaussian Mixture Model (GMM), wherein one cluster represents footfall events, and another cluster represents noise events, to form at least one trained GMM based model capable of distinguishing the footfall events from the noise events based on one or more statistical properties;

multiply the each segment of the N equal segments classified as the footfall events with a Gaussian window centered at segment's peak amplitude to obtain smooth and spectrally consistent footfall signals;

extract, from the each resulting smooth and spectrally consistent footfall signal, second feature vectors (FE-II), corresponding to refined time domain and frequency domain features, to further train:

a plurality of one-class learning models, each trained with the second feature vectors (FE-II) of an individual registered user to enable imposter detection by modelling only user specific class; and a multi-class learning model using the second feature vectors (FE-II) to associate footfall signatures with corresponding registered users; and store the trained GMM based model; and an identification module to detect an imposter and/or to identify a registered user during a live phase comprising user activity, wherein the imposter is detected if each of second feature vectors (FE-II) obtained during the user activity are identified as outliers by the all trained plurality of one-class learning models, and wherein if the each of the second feature vectors (FE-II) obtained during the user activity are not identified as outliers by any of the all trained plurality of one-class learning models, the registered user is identified by the multi-class learning model, wherein the each of the second feature vectors (FE-II) are classified into predefined user class corresponding to the registered user.

7. The smart device as claimed in claim 6, wherein the event extraction module facilitates the trained GMM based model clustering, wherein the clustering comprises:

classifying the cluster with a higher variance to the footfall events and classifying the cluster with a lower variance to the noise events.

8. The smart device as claimed in claim 7, wherein the event extraction module facilitates the footfall events clustering and the noise events clustering by parameterizing each of the footfall events cluster and the noise events cluster based on one or more statistical properties comprising at least a set of $\varphi$, $\mu$, and $\Sigma$, wherein to classify and label the cluster with the higher variance and the lower variance to the footfall events or the noise events respectively comprises utilizing the equation:

$$\text{Class} = \begin{cases} C_1 \to \text{Event}, C_2 \to \text{Noise: } |\Sigma_{C_1}| > |\Sigma_{C_2}| \\ C_1 \to \text{Noise}, C_2 \to \text{Event: } |\Sigma_{C_2}| > |\Sigma_{C_1}| \end{cases}$$

where $|\Sigma_{C_k}|$ is determinant of co-variance matrix of kth clusters.

9. The smart device as claimed in claim 6, wherein during the live phase, the each of the N equal segments of the footfall events generated seismic signals are classified by:

$$\text{Class} = \begin{cases} C_1: p(C_1 \mid f_{test}^{w_i}) > p(C_2 \mid f_{test}^{w_i}) \\ C_2: p(C_2 \mid f_{test}^{w_i}) > p(C_1 \mid f_{test}^{w_i}) \end{cases}$$

where $$f_{test}^{w_i}$$

is the feature vector of the $i^{th}$ segment of a test signal Signal$_{test}$, $$p(C_k | f_{test}^{w_i}) \left( = \varphi C_k N(f_{test}^{w_i} | \mu_{C_k}, \Sigma_{C_k}) \text{for } k = 1.2 \right)$$

is a probability that $$f_{test}^{w_i}$$

belongs to class $C_k$, test signal Signal$_{test}$ is the seismic signal generated by the imposter or the registered user during the live phase and the test signal Signal$_{test}$ is segmented into equal parts ($w_{i_{test}}$).

* * * * *